(12) United States Patent
Otsuka et al.

(10) Patent No.: US 7,762,605 B2
(45) Date of Patent: Jul. 27, 2010

(54) LOCKING DEVICE

(75) Inventors: Taiyou Otsuka, Toyota (JP); Makoto Asano, Toyota (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 297 days.

(21) Appl. No.: 11/915,778

(22) PCT Filed: Mar. 20, 2006

(86) PCT No.: PCT/JP2006/305537

§ 371 (c)(1),
(2), (4) Date: Feb. 28, 2008

(87) PCT Pub. No.: WO2006/132018

PCT Pub. Date: Dec. 14, 2006

(65) Prior Publication Data

US 2009/0224586 A1    Sep. 10, 2009

(30) Foreign Application Priority Data

Jun. 8, 2005    (JP) .............................. 2005-168495

(51) Int. Cl.
*B60N 2/30*    (2006.01)
(52) U.S. Cl. ............. 296/65.03; 248/503.1; 297/378.13
(58) Field of Classification Search ............. 248/503.1; 292/216, 336, DIG. 55, DIG. 56, DIG. 73; 296/65.03; 297/336, 378.13
See application file for complete search history.

(56) References Cited

U.S. PATENT DOCUMENTS 6,022,166 A * 2/2000 Rogers et al. ............. 403/322.4

(Continued)

FOREIGN PATENT DOCUMENTS

EP    1516771    3/2005

(Continued)

OTHER PUBLICATIONS

English Language Abstract of JP 2005-7966.
English Language Abstract of JP 2004-238841.
English Language Abstract of JP 2004-34768.

*Primary Examiner*—Glenn Dayoan
*Assistant Examiner*—Paul A Chenevert
(74) *Attorney, Agent, or Firm*—Greenblum & Bernstein, P.L.C.

(57) ABSTRACT

A spring force of a thrust spring can be determined independently of a spring force of a locking spring, reducing an operating load of an unlocking operation. A locking device includes a locking mechanism provided on one of two members to be engaged with each other, and a striker provided on the other of the two members. The locking mechanism includes a base plate, a hook, a pawl, a cam, a locking spring, a thrust spring and a canceling plate. The base plate has a recess that is capable of receiving the striker. The hook, when rotated relative to the base plate, is capable of forming a locked condition in which the striker is held between the hook and the recess of the base plate or an unlocked condition in which the hook is spaced away from the striker. The pawl is capable of rotating relative to the base plate and maintaining the hook in the locked condition. The cam is capable of further pressing the hook in the locked condition toward a locking direction. The locking spring is capable of biasing the hook and the pawl such that the hook and the pawl are stabilized in the locked condition or the unlocked condition. The thrust spring is capable of biasing the cam in a direction to press the hook. The canceling plate is rotatably supported via a shaft of the hook and is coaxially rotatable with the hook. The canceling plate has a movable range in which the canceling plate can rotate relative to the hook and has a contacting portion that is capable of contacting the striker within the movable range when the hook is in the locked condition.

9 Claims, 7 Drawing Sheets

U.S. PATENT DOCUMENTS

| | | | | |
|---|---|---|---|---|
| 6,123,379 | A * | 9/2000 | Yamada et al. | 296/65.03 |
| 6,412,849 | B1 * | 7/2002 | Fast | 296/65.03 |
| 6,629,710 | B1 | 10/2003 | Shafry et al. | |
| 6,945,585 | B1 * | 9/2005 | Liu et al. | 296/65.03 |
| 7,044,552 | B2 | 5/2006 | Muller et al. | |
| 7,108,305 | B2 * | 9/2006 | Frazier et al. | 296/65.03 |
| 7,243,974 | B2 * | 7/2007 | Kondo et al. | 296/65.03 |
| 7,575,280 | B2 * | 8/2009 | Palomba et al. | 297/336 |
| 2005/0104384 | A1 | 5/2005 | Kondo et al. | |
| 2005/0236862 | A1 * | 10/2005 | Martone et al. | 296/65.03 |
| 2005/0269854 | A1 * | 12/2005 | Lutzka et al. | 297/378.13 |
| 2006/0125273 | A1 * | 6/2006 | Lutzka et al. | 296/65.03 |
| 2007/0222250 | A1 * | 9/2007 | Miller et al. | 296/65.03 |

FOREIGN PATENT DOCUMENTS

| | | |
|---|---|---|
| JP | 200434768 | 2/2004 |
| JP | 2004238841 | 8/2004 |
| JP | 20057966 | 1/2005 |

\* cited by examiner

LOCKING DEVICE

TECHNICAL FIELD

The present invention relates to a locking device that is mainly used to lock a vehicle seat to a vehicle body side or to release the lock.

BACKGROUND ART

A known example of a locking device of this type is a technique disclosed in Patent Document 1. In this technique, a locking mechanism is provided on a seat side, and a striker is provided on a vehicle body side. The locking mechanism includes a base plate having a recess capable of receiving the striker, a hook, a pawl and a cam. The hook is rotatably attached to the base plate via a shaft, so that the locking mechanism is in a locked condition in which the striker is held between the hook and the recess of the base plate or in an unlocked condition in which the hook is spaced away from the striker. The pawl and the cam are rotatably attached to the base plate via a common shaft.

A locking spring is positioned between the hook and the pawl. The locking spring biases the hook and the pawl such that the hook and the pawl are stabilized at a rotational position corresponding to the locked condition or the unlocked condition. Also, a thrust spring is positioned between the cam and the base plate. The thrust spring biases the cam in a direction that the hook in the locked condition is further pressed toward a locking direction. As a result, a clearance between the striker and the locking mechanism in the locked condition is forcibly reduced.

Patent Document 1: EP1516771A1

DISCLOSURE OF THE INVENTION

Problem to be Solved by the Invention

In this way, when the hook and the pawl are retained in the locked condition, the locking spring biases the hook toward an unlocking direction. Conversely, at this time, the thrust spring biases the cam such that the hook is pressed toward the locking direction against a force of the locking spring. Therefore, a spring force of the thrust spring must be set so as to be normally greater than the locking spring. As a result, a large operating load will be required for unlocking the locking mechanism.

The present invention has been made for solving such problems. It is one object of the present invention to make it possible to freely determine a spring force of a thrust spring independently of a spring force of a locking spring, thereby reducing an operating load of an unlocking operation.

Means for Solving the Problem

The present invention has the following structure in order to achieve the above-mentioned objects.

A first invention is a locking device, which includes a locking mechanism provided on one of two members to be engaged with each other, and a striker provided on the other of the two members. The locking mechanism includes a base plate, a hook, a pawl, a cam, a locking spring, a thrust spring and a canceling plate.

The base plate has a recess that is capable of receiving the striker. The hook is rotatably attached to the base plate via a shaft. The hook, when rotated, is capable of forming a locked condition in which the striker is held between the hook and the recess of the base plate or an unlocked condition in which the hook is spaced away from the striker. The pawl is rotatably attached to the base plate via a shaft. The pawl is capable of rotating to a position in which the pawl can engage the hook and maintaining the hook in the locked condition. The cam is rotatably supported via the shaft of the pawl and is coaxially rotatable with the pawl. The cam is capable of further pressing the hook in the locked condition toward a locking direction. The locking spring is provided between the pawl and the canceling plate. The locking spring is capable of biasing the hook and the pawl such that the hook and the pawl are stabilized in the locked condition or the unlocked condition. The thrust spring is provided between the cam and the base plate and is capable of biasing the cam in a direction to press the hook. The canceling plate is rotatably supported via the shaft of the hook and is coaxially rotatable with the hook. The canceling plate has a movable range in which the canceling plate can rotate relative to the hook and has a contacting portion that contacts the striker within the movable range when the hook is in the locked condition.

According to this structure, when the hook of the locking mechanism is in the locked condition, the contacting portion of the canceling plate contacts the striker, so as to prevent the biasing force of the locking spring from acting on the hook. Therefore, a spring force of the thrust spring for further pressing the hook in the locked condition toward the locking direction can be freely determined independently of a spring force of the locking spring. As a result, the biasing force of the thrust spring can be reduced without changing the spring force of the locking spring, so that an operation load for unlocking the locking mechanism can be reduced.

A second invention corresponds to the locking device of the first invention, in which the cam comprises a contact portion that is capable of contacting the hook. The contact portion is formed with a pressure angle that functions to further rotate the hook in the locked condition toward the locking direction and to maintain the hook while receiving a rotational load that is applied to the hook toward an unlocking direction.

The pressure angle formed in the contact portion of cam may further increase a function that further press the hook in the locked condition toward the locking direction based on the spring force of the thrust spring.

A third invention is a locking device, which includes a locking mechanism provided on one of two members to be engaged with each other, and a striker provided on the other of the two members. The locking mechanism includes a base plate, a hook, a pawl, a cam, a locking spring, a thrust spring and a transmission member.

The base plate has a recess that is capable of receiving the striker. The hook is rotatably attached to the base plate via a shaft. The hook, when rotated, is capable of forming a locked condition in which the striker is held between the hook and the recess of the base plate or an unlocked condition in which the hook is spaced away from the striker. The pawl is rotatably attached to the base plate via a shaft. The pawl is capable of rotating to a position in which the pawl can engage the hook and maintaining the hook in the locked condition. The cam is formed with a pressure angle that functions to further rotate the hook in the locked condition toward the locking direction and to maintain the hook while receiving a rotational load that is applied to the hook toward an unlocking direction. The locking spring is capable of biasing the pawl toward an engaging direction or a non-engaging direction with respect to the hook. The thrust spring is provided between the cam and the base plate and is capable of biasing the cam in a direction to press the hook. The transmission member is capable of transmitting a spring force of the locking spring to the hook or the striker. The transmission member contacts the striker when the hook is in the locked condition, thereby transmitting the spring force of the locking spring to the striker. Also, the transmission member is released from the striker and contacts the hook when the hook is in the unlocked condition, thereby transmitting the spring force of the locking spring to the hook.

According to this structure, depending on whether the hook of the locking mechanism is in the locked condition or the unlocked condition, a transmission target of the biasing force of the locking spring via the transmission member can be reliably switched between the striker and the hook.

A fourth invention corresponds to the locking device of the first, second or third invention, in which the pawl has an engagement end surface that can engage an engagement surface of the hook in the locked condition. The pawl is arranged such that when the hook in the locked condition is further pressed toward the locking direction by means of the cam, the engagement surface of the hook and the engagement end surface of the pawl are spaced away from each other.

According to this structure, in a condition that the hook in the locked condition is further pressed toward the locking direction, the engagement surface of the hook and the engagement end surface of the pawl do not contact each other. This may lead to reduction of noise.

A fifth invention corresponds to the locking device of the first, second, third or fourth invention, in which the pawl has an entrainment portion. The entrainment portion is constructed to contact the cam when the pawl is rotated in a direction to be displaced from a position in which the pawl is capable of engaging the hook, thereby rotating the cam in the direction.

According to this structure, in a lock releasing operation of the locking mechanism, upon rotation of the pawl, the cam can be simultaneously rotated. Therefore, the lock releasing operation can be unified.

A sixth invention corresponds to the locking device of the first, second, third, fourth or fifth invention, in which the two members to be engaged with each other are respectively a floor of a vehicle and a seat cushion of a retractable seat. The locking mechanism and the striker are respectively attached to the seat cushion and the floor.

DESCRIPTION OF REFERENCE SYMBOLS

Figure 1:
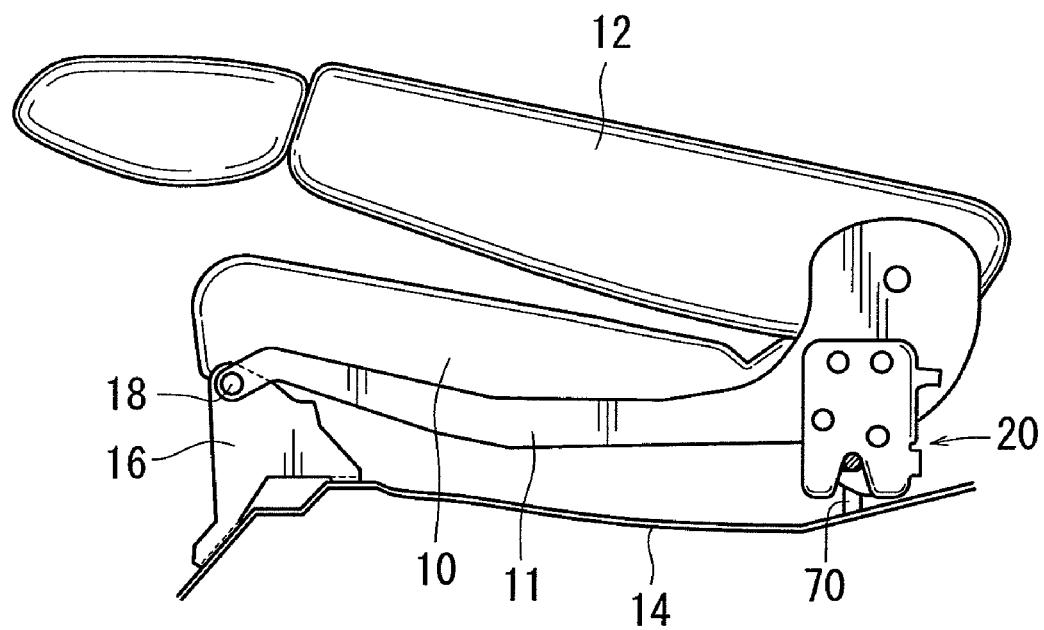
FIG. 1 is a side view of a retractable seat for a vehicle.

10 seat cushion
11 cushion frame
14 floor
20 locking mechanism
22 base plate
23 recess
30 hook
40 canceling plate
41 contacting portion
46 pawl
56 locking spring
60 cam
66 thrust spring
70 striker

BEST MODES FOR CARRYING OUT THE INVENTION

In the following, a preferred embodiment for carrying out the present invention will be described with reference to the drawings.

FIG. 1 is a side view of a retractable seat for a vehicle. In order to retract a seat of this type, a reclining device (not shown) is first operated to fold a seat back 12 onto a seat cushion 10 as shown in FIG. 1. At the same time, a lock releasing operation is performed in order to unlock a locking device that engages a rear side lower portion of the seat cushion 10 with a floor 14 side. Thereafter, the seat cushion 10 is rotated using a front side end portion thereof as a fulcrum, so that the entire seat is raised against a back surface of a front seat (not shown).

As a structure for this purpose, the front side end portion of a cushion frame 11 of the seat cushion 10 is connected to a hinge bracket 16 fixed to the floor 14 via a rotation shaft 18. Further, the locking device engaging the rear side lower portion of the cushion frame 11 with the floor 14 side is roughly divided into a locking mechanism 20 that is positioned at the rear side lower portion (one of two members) of the cushion frame 11, and a striker 70 that is fixed to the floor 14 (the other of the two members). The seat shown in FIG. 1 is, for example, a rear seat for three passengers. A connection structure that is composed of the hinge bracket 16 and the rotation shaft 18 and the locking device that is composed of the locking mechanism 20 and the striker 70 are respectively disposed on, for example, both sides of the seat.

Figure 2:
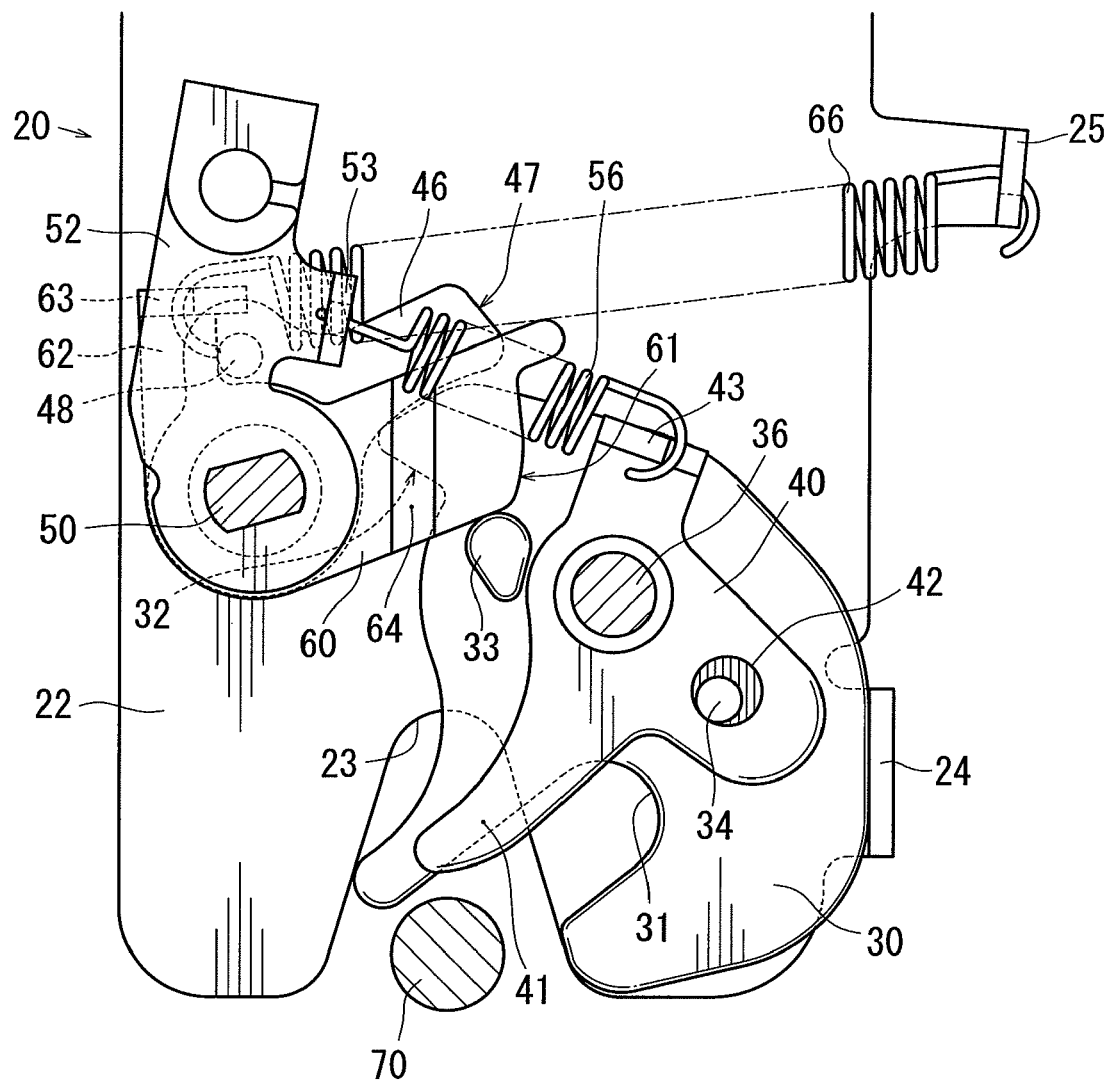
FIG. 2 is a structural view of a locking device, which illustrates an unlocked condition thereof.
Figure 3:
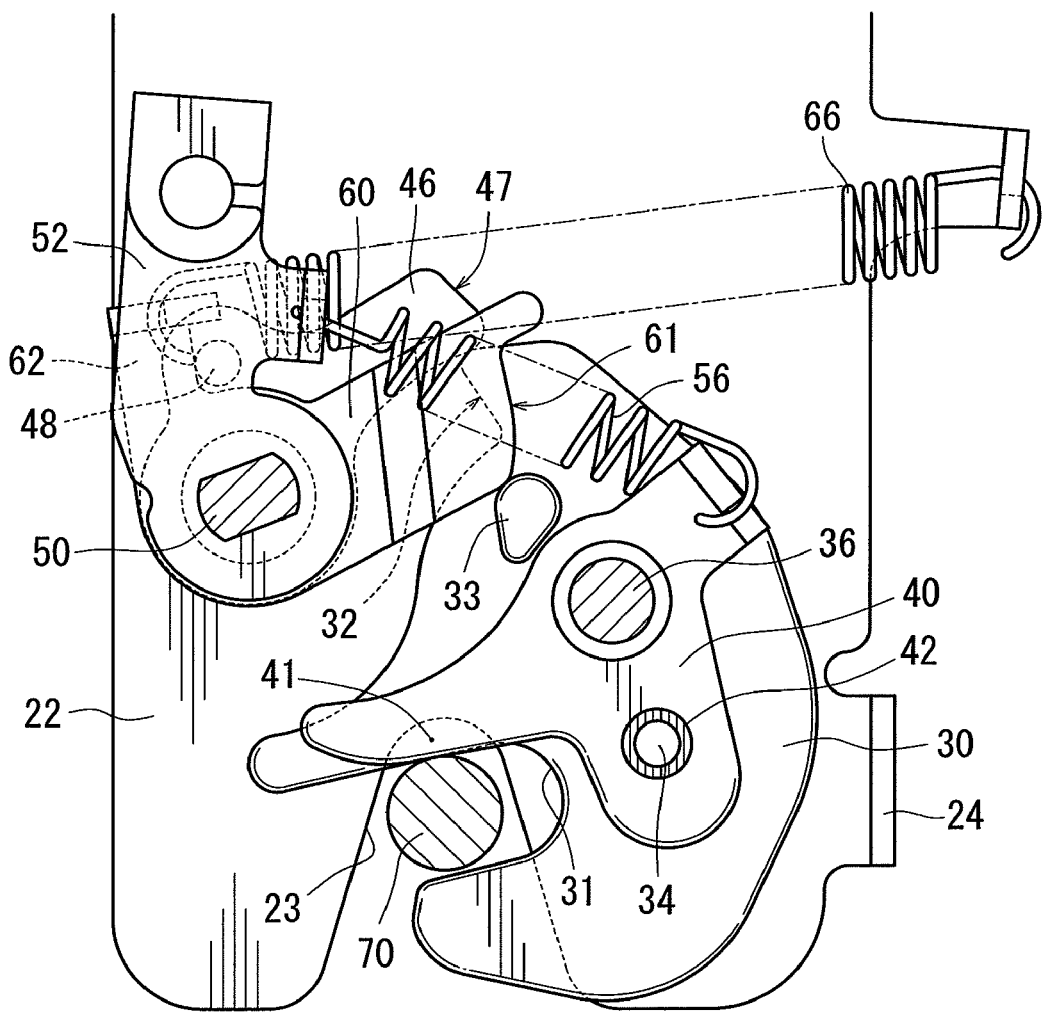
FIG. 3 is a structural view of the locking device, which illustrates a half-locked condition thereof.
Figure 4:
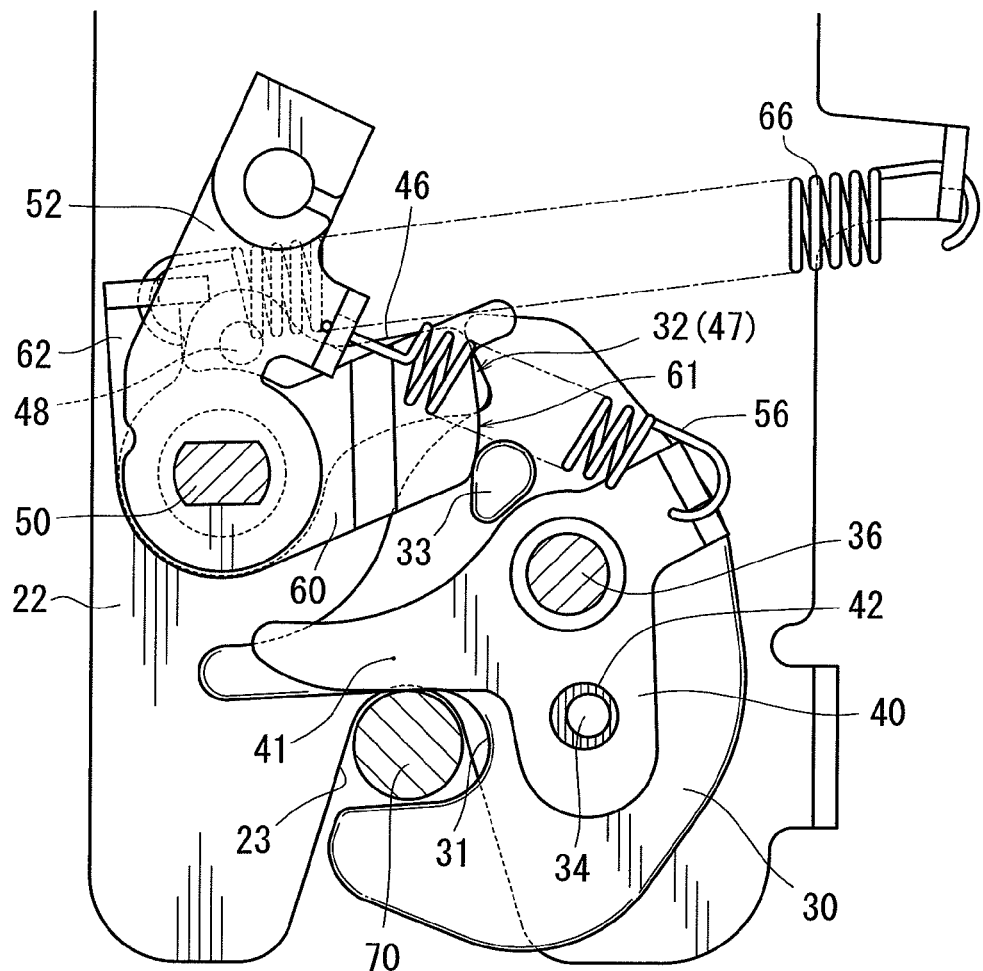
FIG. 4 is a structural view of the locking device, which illustrates a locked condition thereof.
Figure 5:
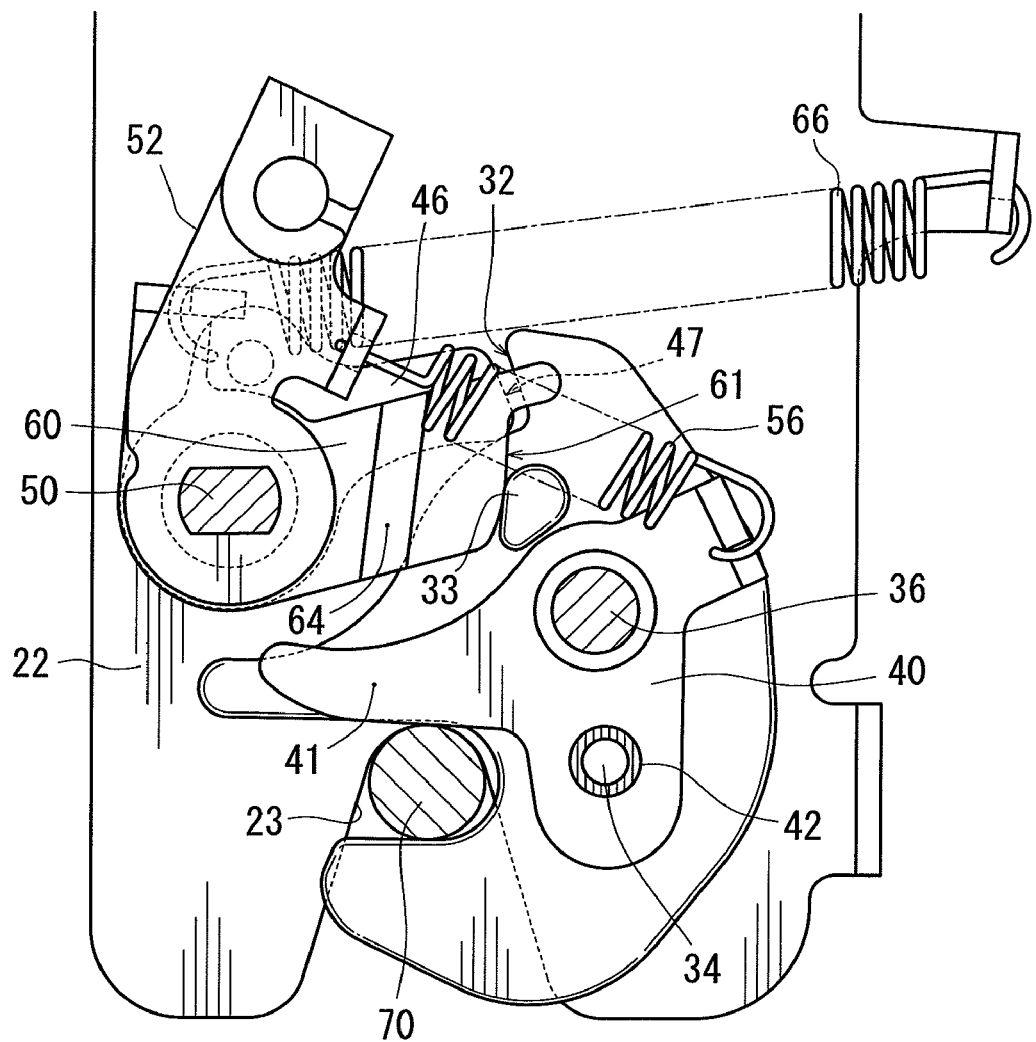
FIG. 5 is a structural view of the locking device, which illustrates a thrust condition thereof.

FIG. 2 is a structural view of the locking device in an unlocked condition. FIG. 3 is a structural view of the locking device in a half-locked condition. FIG. 4 is a structural view of the locking device in a locked condition. FIG. 5 is a structural view of the locking device in a thrust condition. As shown in these drawings, the locking mechanism 20 includes a base plate 22, a hook 30, a canceling plate 40, a pawl 46 (including a release lever 52) and a thrusting cam 60. The base plate 22 is composed of a pair of superimposed plate elements, so that the remaining components of the locking mechanism 20 are positioned between the plate elements. However, in FIGS. 2-5, the nearer plate element is omitted. The base plate 22 is connected to the cushion frame 11 (FIG. 1).

A lower portion of the base plate 22 is provided with a recess 23 that is downwardly opened. The recess 23 can receive the striker 70 from an open side thereof. An opening width of the recess is gradually increased downwardly, so as to facilitate receiving of the striker. The base plate 22 has a stopper 24 and a spring engagement portion 25 that are formed therein by partly folding a right side periphery of thereof.

The hook 30 is rotatably attached to a support shaft 36 that is fixed to the base plate 22. The hook 30 has a hook recess 31 that is opened leftwardly in the drawings. When the hook recess 31 engages the striker 70 that is received in the recess 23 of the base plate 22, the striker 70 is held between the hook recess 31 and the recess 23, so that the locked condition of the locking mechanism 20 is obtained FIG. 4. The hook 30 has an engagement surface 32 that is formed in a circumferential surface thereof, and a projection 33 that is integrally projected therefrom, which protrusion is positioned between the engagement surface 32 and the support shaft 36. Also, the hook 30 has a cylindrical engagement protrusion 34 that is integrally formed therein, which protrusion is opposed to the projection 33 across the support shaft 36. Further, the engagement protrusion 34 can be replaced with a pin or other such member that is fixedly attached to the hook 30.

The canceling plate 40 is rotatably attached to the support shaft 36 of the hook 30. The canceling plate 40 has a contacting portion 41 that extends along one of opposite peripheries of the hook recess 31 of the hook 30, and a spring engagement portion 43 that is formed therein by folding an opposite end portion of the contacting portion 41. Also, the canceling plate 40 has a circular engagement hole 42 in which the engagement protrusion 34 of the hook 30 is loosely received. Thus, a clearance is formed between an outer circumferential surface of the engagement protrusion 34 and an inner circumferential surface of the engagement hole 42, so as to define a movable range in which the canceling plate 40 can rotate relative to the hook 30. Further, after the engagement protrusion 34 and the engagement hole 42 eccentrically contact each other, the hook 30 and the canceling plate 40 may integrally rotate.

The pawl 46, the release lever 52 and the cam 60 are respectively attached to a support shaft 50 that is rotatably attached to the base plate 22. The pawl 46 and the release lever 52 is attached to the support shaft 50 so as to rotate integrally therewith, whereas the cam 60 is rotatably attached to the support shaft 50. Therefore, the pawl 46 and the release lever 52 may integrally rotate via the support shaft 50, and the cam 60 may rotate relative to the pawl 46 and the release lever 52. Further, the release lever 52 is connected to an operation cable or other such element (not shown) for performing the lock releasing operation, so that the pawl 46 can be rotated when the lock releasing operation is performed.

The pawl 46 has an engagement end surface 47 that can contact and push the engagement surface 32 of the hook 30, and a protrusion 48 that is capable of contacting a portion of the cam 60. Conversely, the release lever 52 has a spring engagement portion 53 that is formed by partly folding a side periphery of thereof. A locking spring 56, composed of a tension coil spring, is positioned between the spring engagement portion 53 and the spring engagement portion 43 of the canceling plate 40. By a spring force of the locking spring 56, the hook 30 is being biased counterclockwise in the drawings via the canceling plate 40 and at the same time, the pawl 46 is biased clockwise via the release lever 52. Further, the protrusion 48 of the pawl 46 corresponds to "an entrainment portion" of the present invention.

The thrusting cam 60 has a contact surface 61 that is capable of contacting the projection 33 of the hook 30, which surface is formed in a distal end portion thereof. The contact surface 61 corresponds to "a contact portion" of the present invention. Further, the cam 60 has an arm portion 62 that is capable of contacting the protrusion 48 of the pawl 46, and a spring engagement portion 63 that is formed by partly folding an end portion of the arm portion 62. A thrust spring 66 composed of a tension coil spring is positioned between the spring engagement portion 63 and the spring engagement portion 25 of the base plate 22. By a spring force of the thrust spring 66, the cam 60 is being biased clockwise. Further, the cam 60 has a deformation promoting portion 64 that is formed between the contact surface 61 and a portion supported by the support shaft 50, which portion is swollen to a bead-like shape. The deformation promoting portion 64 can deform with a smaller force than the other portions when the cam 60 is applied with a load from the hook 30 side.

Next, a function of the locking device will be described.

First, the locking mechanism 20 is now in the unlocked condition shown in FIG. 2. In this condition, the hook 30 is being biased counterclockwise via the canceling plate 40 due to the spring force of the locking spring 56. That is, the engagement protrusion 34 of the hook 30 and the engagement hole 42 of the canceling plate 40 eccentrically contact each other. In addition, the circumferential surface of the hook 30 contacts the stopper 24 of the base plate 22, so that the hook 30 is stabilized. Further, the pawl 46 (including the release lever 52), biased clockwise due to the spring force of the locking spring 56, contacts the circumferential surface of the hook 30, so as to be stabilized. Also, the cam 60 biased clockwise due to the spring force of the thrust spring 66 contacts the projection 33 of the hook 30, so as to be stabilized.

In the unlocked condition, when the seat cushion 10 is moved in order to be set in the floor 14 side, the striker 70 positioned on the floor 14 side enters the recess 23 formed in the base plate 22 of the locking mechanism 20 (FIG. 3). Upon entering of the striker 70, the hook recess 31 of the hook 30 engages the striker 70 and at the same time, the contacting portion 41 of the canceling plate 40 contacts the striker 70. As a result, the hook 30 and the canceling plate 40 rotate counterclockwise against the spring force of the locking spring 56, so that the locked condition shown in FIG. 4 is obtained. In this locked condition, the pawl 46 is rotated clockwise due to the spring force of the locking spring 56, so that the engagement end surface 47 thereof contacts the engagement surface 32 of the hook 30. Thus, the hook 30 is maintained in the locked condition (FIG. 4).

When the locking device is changed to the locked condition shown in FIG. 4, the cam 60 is rotated clockwise due to the spring force of the thrust spring 66. As a result, the contact surface 61 of the cam 60 pushes the projection 33 of the hook 30, thereby further rotating the hook 30 clockwise. That is, a pressure angle is defined in the contact surface 61 of the cam 60, so as to apply a clockwise biasing force to the hook 30. As a result, the striker 70 can be thrust into the recess 23 of the base plate 22 (FIG. 5). Therefore, the striker 70 is firmly held between the recess 23 of the base plate 22 and the hook recess 31 of the hook 30, so that a clearance between the locking mechanism 20 and the striker 70 can be eliminated.

Figure 6:
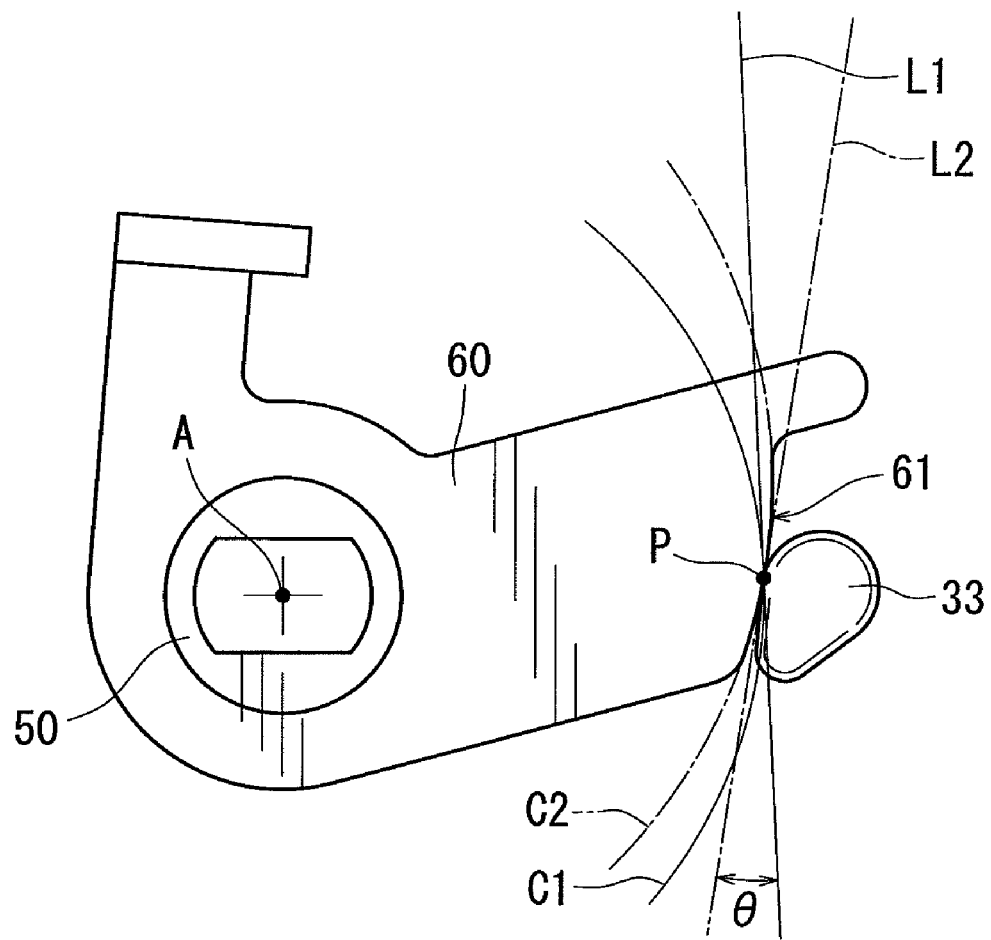
FIG. 6 is an explanatory view of a pressure angle defined in a contact surface of a cam.

FIG. 6 is an explanatory view of the pressure angle defined in the contact surface 61 of the cam 60. In this drawing, a rotation center of the cam 60, i.e., an axis of the support shaft 50, will be referred to as A. Also, a contact point of the contact surface 61 of the cam 60 and the projection 33 of the hook 30 is referred to as P. In addition, a circular arc centered on the axis A and passing through the contact point P will be referred to as C1. Also, a circular arc extending along the contact surface 61 of the cam 60 and passing through the contact point P will be referred to as C2. Further, a tangential line with respect to the circular arc C1 at the contact point P will be referred to as L1. Also, a tangential line with respect to the circular arc C2 at the contact point P will be referred to as L2. The pressure angle in the contact surface 61 corresponds to an angle θ formed by the tangential lines L1 and L2. When the cam 60 rotates clockwise in FIG. 6, the hook 30 can be rotated clockwise due to the pressure angle θ.

Further, the pressure angle θ in the contact surface 61 is restricted as follows. That is, if the pressure angle θ is excessively reduced, a clockwise rotational angle of the hook 30 is reduced when the cam 60 rotates clockwise. As a result, a rotational angle of the cam 60 must be increased, so that freedom of design is restricted. To the contrary, if the pressure angle θ is excessively increased, when the hook 30 is applied with a counterclockwise load, the cam 60 is pushed counterclockwise, so that the contact surface 61 may be disengaged from the projection 33 of the hook 30. Therefore, the pressure angle θ may preferably be 5-12 degrees, more preferably, 7-10 degrees.

When the hook 30 is in a locked position shown in FIGS. 4 and 5, a biasing force of the locking spring 56 functions to rotate the canceling plate 40 counterclockwise. At this time, the contacting portion 41 of the canceling plate 40 contacts the striker 70, so that a rotational position of the canceling plate 40 can be determined. In this condition, the engagement protrusion 34 of the hook 30 and the engagement hole 42 of the canceling plate 40 concentrically positioned without contacting each other. That is, the canceling plate 40 is in the movable range in which the canceling plate 40 can rotate relative to the hook 30. Therefore, the biasing force of the locking spring 56 acting on the canceling plate 40 does not function to bias the hook 30.

Thus, the canceling plate 40 can be taken as "a transmission member" that may transmit the biasing force of the locking spring 56 to the hook 30 or the striker 70 based on whether the hook 30 is in the unlocked condition or the locked condition.

As described above, the thrust spring 66 may function to bias the cam 60, so as to press the hook 30 toward a locking direction against the biasing force of the locking spring 56. However, when the hook 30 is in the locked position, the biasing force of the locking spring 56 does not function to bias the hook 30. Therefore, the spring force of the thrust spring 66 can be freely determined independently of the spring force of the locking spring 56.

In the thrust condition shown in FIG. 5, although the engagement surface 32 of the hook 30 is spaced away from the engagement end surface 47 of the pawl 46, they are positioned so as to contact each other. Therefore, when a large load is generated in a direction that the striker 70 is disengaged from the recess 23 of the base plate 22, the deformation promoting portion 64 of the cam 60 is deformed, so that the engagement surface 32 of the hook 30 contacts the engagement end surface 47 of the pawl 46. As a result, a clearance elimination function for eliminating the clearance between the locking mechanism 20 and the striker 70 is canceled. However, the locking mechanism 20 is maintained in the locked condition. In this way, when a load having a predetermined value or more is exerted between the locking mechanism 20 and the striker 70 in the locked condition, the deformation promoting portion 64 of the cam 60 can be deformed before any other portions contained in a transmission route thereof are deformed. As a result, fatal portions of the locking mechanism 20 can be prevented from deforming, thereby maintaining at least the original locking function.

When the locking mechanism 20 is unlocked, the pawl 46 is rotated counter clockwise against the spring force of the locking spring 56 via the release lever 52. As a result, the engagement end surface 47 of the pawl 46 is displaced from a position opposed to the engagement surface 32 of the hook 30. Thereafter, the protrusion 48 of the pawl 46 contacts the arm portion 62 of the cam 60. Also, the cam 60 is rotated counterclockwise with the pawl 46 against the spring force of the thrust spring 66, so that the contact surface 61 thereof is disengaged from the projection 33 of the hook 30. As a result, the hook 30 is returned to the condition shown in FIG. 2 with the canceling plate 40, so that the locking mechanism 20 is changed to the unlocked condition.

Figure 7:
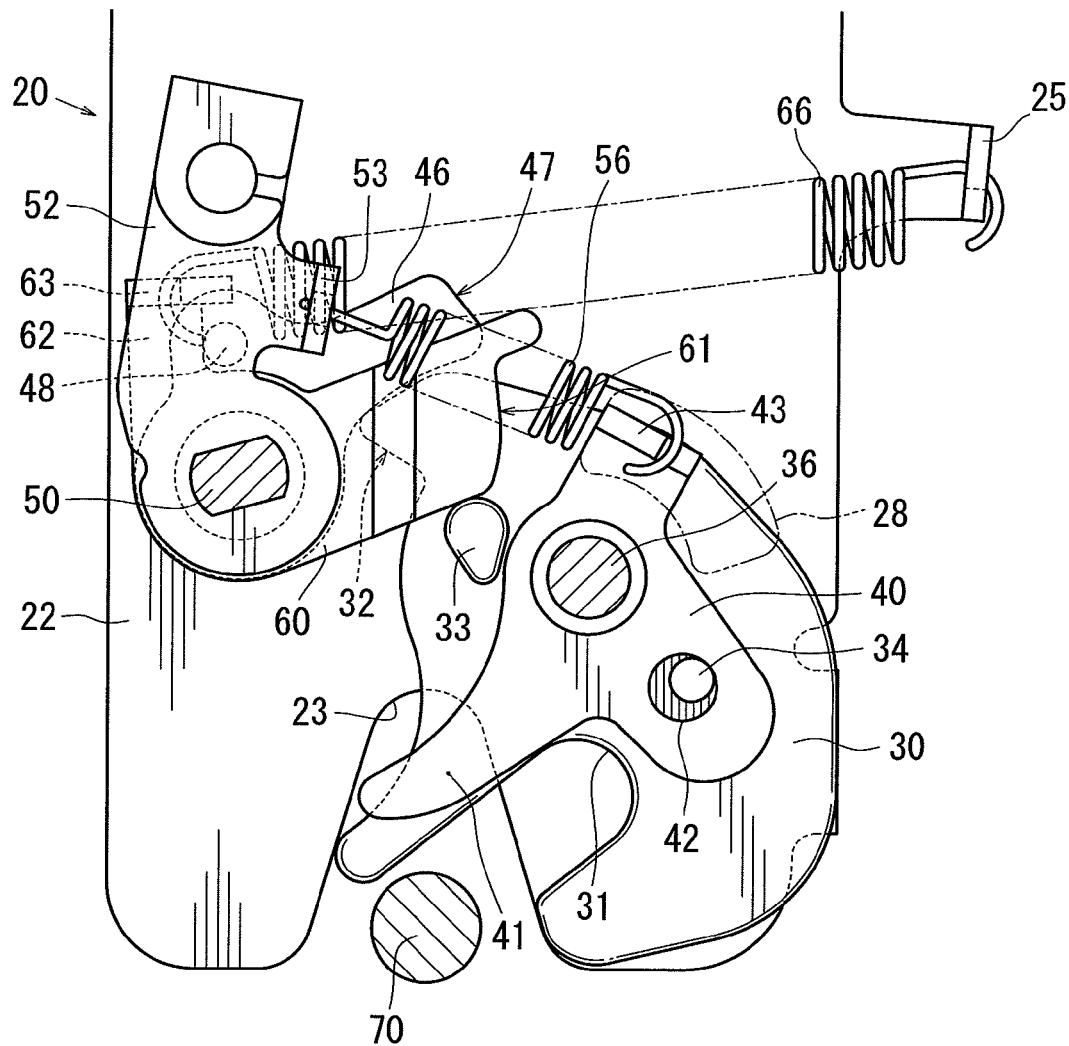
FIG. 7 is a structural view of a locking device according to a different embodiment, which view corresponds to FIG. 2.

FIG. 7 is a structural view of the locking device 20 according to a different embodiment, which view corresponds to FIG. 2. In the locking device 20 shown in this drawing, the base plate 22 is not provided with the stopper 24. Instead, a stopper hole 28 is formed in one of the plate elements of the base plate 22. The spring engagement portion 43 of the canceling plate 40 is positioned in the stopper hole 28. As shown in the drawing, when the locking mechanism 20 is in the unlocked condition, the spring engagement portion 43 of the canceling plate 40 that is biased counterclockwise by the spring force of the locking spring 56 contacts a periphery of the stopper hole 28, so that the canceling plate 40 is stabilized. Thus, in the unlocked condition, the spring force of the locking spring 56 is received in the canceling plate 40 side. At this time, the engagement protrusion 34 of the hook 30 and the engagement hole 42 of the canceling plate 40 eccentrically contact each other at a portion opposite to a portion shown in FIG. 2. Further, in the half-locked condition, the locked condition and the thrust condition, the locking mechanism 20 shown in FIG. 7 may function in substantially the same manner as FIGS. 3-5.

The preferred embodiment for carrying out the present invention have been described with reference to the drawings. However, the embodiment can be easily changed or modified without departing from the gist of the present invention.

For example, in the present embodiment, the seat cushion 10 of the retractable seat and the floor 14 are exemplified as the two members that respectively have the locking mechanism 20 and the striker 70. However, they can be replaced with any two members that require locking and unlocking by the locking device. Further, in the locking mechanism 20, as a mechanism for defining the movable range in which the canceling plate 40 can rotate relative to the hook 30, following mechanisms (a) and (b) can be used in place of a combination of the engagement protrusion 34 and the engagement hole 42.

(a) The engagement hole 42 of the canceling plate 40 can be changed to a slot having an opening portion opened to a direction that is not expected to contact (interfere with) the engagement protrusion 34 of the hook 30. In this case, three types of slots are available with regard to the direction of the opening portion.

Type 1: In the locking mechanism 20 shown in FIGS. 1-7, the engagement hole 42 can be changed to a slot having an opening portion that is opened downwardly to the right in, for example, FIGS. 2 and 7.

Type 2: In the locking mechanism 20 shown in FIGS. 1-6, the engagement hole 42 can be changed to a slot having an opening portion that is opened upwardly to the right in, for example, FIG. 2.

Type 3: In the locking mechanism 20 shown in FIG. 7, the engagement hole 42 can be changed to a slot having an opening portion that is opened downwardly to the left in FIG. 7.

(b) The engagement protrusion 34 of the hook 30 and the engagement hole 42 of the canceling plate 40 can be replaced with each other. For example, an outer periphery of the hook 30 can be formed with a removed or recessed portion. Conversely, the canceling plate 40 is provided with a projection that is loosely engaged with the recessed portion.

The invention claimed is:

1. A locking device, comprising:
   a locking mechanism provided on one of two members to be engaged with each other; and
   a striker provided on the other of the two members, wherein the locking mechanism comprises a base plate, a hook, a pawl, a cam, a locking spring, a thrust spring and a canceling plate, wherein the base plate has a recess that is capable of receiving the striker, wherein the hook is rotatably attached to the base plate via a shaft, further wherein the hook, when rotated, is capable of forming a locked condition in which the striker is held between the hook and the recess of the base plate or an unlocked condition in which the hook is spaced away from the striker, wherein the pawl is rotatably attached to the base plate via a shaft, further wherein the pawl is capable of rotating to a position in which the pawl can engage the hook and maintaining the hook in the locked condition, wherein the cam is rotatably supported via the shaft of the pawl and is coaxially rotatable with the pawl, further wherein the cam is capable of further pressing the hook in the locked condition toward a locking direction, wherein the locking spring is provided between the pawl and the canceling plate, further wherein the locking spring is capable of biasing the hook and the pawl such that the hook and the pawl are stabilized in the locked condition or the unlocked condition, wherein the thrust spring is provided between the cam and the base plate and is capable of biasing the cam in a direction to press the hook, and wherein the canceling plate is rotatably supported via the shaft of the hook and is coaxially rotatable with the hook, further wherein the canceling plate has a movable range in which the canceling plate can rotate relative to the hook and has a contacting portion that is capable of contacting the striker within the movable range when the hook is in the locked condition.

2. The locking device as defined in claim 1, wherein the cam comprises a contact portion that is capable of contacting the hook, wherein the contact portion is formed with a pressure angle that functions to further rotate the hook in the locked condition toward the locking direction and to maintain the hook while receiving a rotational load that is applied to the hook toward an unlocking direction.

3. The locking device as defined in claim 1, wherein the pawl has an engagement end surface that can engage an engagement surface of the hook in the locked condition, and wherein the pawl is arranged such that when the hook in the locked condition is further pressed toward the locking direction by the cam, the engagement surface of the hook and the engagement end surface of the pawl are spaced away from each other.

4. The locking device as defined in claim 1, wherein the pawl has an entrainment portion, and wherein the entrainment portion is constructed to contact the cam when the pawl is rotated in a direction to be displaced from a position in which the pawl is capable of engaging the hook, thereby rotating the cam in the direction.

5. The locking device as defined in claim 1, wherein the two members to be engaged with each other respectively comprise a floor of a vehicle and a seat cushion of a retractable seat, and wherein the locking mechanism and the striker are respectively attached to the seat cushion and the floor.

6. A locking device, comprising:

a locking mechanism provided on one of two members to be engaged with each other; and a striker provided on the other of the two members, wherein the locking mechanism comprises a base plate, a hook, a pawl, a cam, a locking spring, a thrust spring and a transmission member, wherein the base plate has a recess that is capable of receiving the striker, wherein the hook is rotatably attached to the base plate via a shaft, further wherein the hook, when rotated, is capable of forming a locked condition in which the striker is held between the hook and the recess of the base plate or an unlocked condition in which the hook is spaced away from the striker, wherein the pawl is rotatably attached to the base plate via a shaft, further wherein the pawl is capable of rotating to a position in which the pawl can engage the hook and maintaining the hook in the locked condition, wherein the cam is formed with a pressure angle that functions to further rotate the hook in the locked condition toward the locking direction and to maintain the hook while receiving a rotational load that is applied to the hook toward an unlocking direction, wherein the locking spring is capable of biasing the pawl toward an engaging direction or a non-engaging direction with respect to the hook, wherein the thrust spring is provided between the cam and the base plate and is capable of biasing the cam in a direction to press the hook, and wherein the transmission member is capable of transmitting a spring force of the locking spring to the hook or the striker, further wherein the transmission member contacts the striker when the hook is in the locked condition, thereby transmitting the spring force of the locking spring to the striker, and further wherein the transmission member is released from the striker and contacts the hook when the hook is in the unlocked condition, thereby transmitting the spring force of the locking spring to the hook.

7. The locking device as defined in claim 6, wherein the pawl has an engagement end surface that can engage an engagement surface of the hook in the locked condition, and wherein the pawl is arranged such that when the hook in the locked condition is further pressed toward the locking direction by the cam, the engagement surface of the hook and the engagement end surface of the pawl are spaced away from each other.

8. The locking device as defined in claim 6, wherein the pawl has an entrainment portion, and wherein the entrainment portion is constructed to contact the cam when the pawl is rotated in a direction to be displaced from a position in which the pawl is capable of engaging the hook, thereby rotating the cam in the direction.

9. The locking device as defined in claim 6, wherein the two members to be engaged with each other respectively comprise a floor of a vehicle and a seat cushion of a retractable seat, and wherein the locking mechanism and the striker are respectively attached to the seat cushion and the floor.

* * * * *